(12) United States Patent
Taniguchi et al.

(10) Patent No.: US 10,804,714 B2
(45) Date of Patent: Oct. 13, 2020

(54) RELAY DEVICE AND IN-VEHICLE SYSTEM

(71) Applicants: AutoNetworks Technologies, Ltd., Yokkaichi, Mie (JP); Sumitomo Wiring Systems, Ltd., Yokkaichi, Mie (JP); Sumitomo Electric Industries, Ltd., Osaka (JP)

(72) Inventors: Tomohiro Taniguchi, Mie (JP); Hiromichi Yasunori, Yokkaichi Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-Shi, Osaka (JP)

( * ) Notice: Subject to any disclaimer, the term of this patent is extended or adjusted under 35 U.S.C. 154(b) by 182 days.

(21) Appl. No.: 16/092,893

(22) PCT Filed: Mar. 28, 2017

(86) PCT No.: PCT/JP2017/012659
§ 371 (c)(1),
(2) Date: Oct. 11, 2018

(87) PCT Pub. No.: WO2017/183400
PCT Pub. Date: Oct. 26, 2017

(65) Prior Publication Data
US 2019/0131804 A1  May 2, 2019

(30) Foreign Application Priority Data

Apr. 18, 2016 (JP) ................................. 2016-082698

(51) Int. Cl.
*B60R 16/023* (2006.01)
*H02J 7/00* (2006.01)
(Continued)

(52) U.S. Cl.
CPC ........ *H02J 7/0029* (2013.01); *B60R 16/0238* (2013.01); *B60R 16/033* (2013.01);
(Continued)

(58) Field of Classification Search
CPC .... H02J 7/0029; H02J 1/00; H02J 7/00; H02J 7/14; H02J 7/1423; H02J 7/1469;
(Continued)

(56) References Cited

U.S. PATENT DOCUMENTS 5,801,514 A   9/1998  Saeki et al.
5,808,444 A   9/1998  Saeki et al.
(Continued)

FOREIGN PATENT DOCUMENTS

JP   2013-172577 A   9/2013
JP   2015-154618 A   8/2015
(Continued)

OTHER PUBLICATIONS

International Search Report, Application No. PCT/JP2017/012659 dated May 9, 2017.

*Primary Examiner* — Robert L Deberadinis
(74) *Attorney, Agent, or Firm* — Honigman LLP

(57) ABSTRACT

Provided is a relay device that is able to supply a charging current to at least two electrical storage units from a power generator. In a relay device, a first electrical storage unit-side conduction path is connected between a power generator-side conduction path and a first electrical storage unit, and a second electrical storage unit-side conduction path is connected between the power generator-side conduction path and a second electrical storage unit. A relay unit breaks electrical continuity between the first electrical storage unit and the second electrical storage unit when a first switch unit provided on the first electrical storage unit-side conduction path and a second switch unit provided on the second
(Continued)

electrical storage unit-side conduction path are OFF. A control unit turns OFF the second switch unit when the first switch unit is ON, and turns OFF the first switch unit when the second switch unit is ON.

7 Claims, 7 Drawing Sheets

(51) Int. Cl.
    *H02J 1/00*     (2006.01)
    *H02J 7/14*     (2006.01)
    *H02H 7/18*     (2006.01)
    *H02H 7/26*     (2006.01)
    *B60R 16/033*     (2006.01)
    *B60R 16/03*     (2006.01)

(52) U.S. Cl.
    CPC ............... *H02H 7/18* (2013.01); *H02H 7/26* (2013.01); *H02J 1/00* (2013.01); *H02J 7/00* (2013.01); *H02J 7/14* (2013.01); *H02J 7/1423* (2013.01); *H02J 7/1469* (2013.01); *B60R 16/03* (2013.01)

(58) Field of Classification Search
    CPC ... B60R 16/0238; B60R 16/033; B60R 16/03; H02H 7/18; H02H 7/26
    See application file for complete search history.

(56) References Cited

U.S. PATENT DOCUMENTS

| | | |
|---|---|---|
| 5,905,361 A | 5/1999 | Saeki et al. |
| 6,008,629 A | 12/1999 | Saeki et al. |
| 2008/0106234 A1 | 5/2008 | Yun |

FOREIGN PATENT DOCUMENTS

| | | |
|---|---|---|
| JP | 2015-204704 A | 11/2015 |
| WO | 2016-031843 A1 | 3/2016 |

RELAY DEVICE AND IN-VEHICLE SYSTEM

CROSS-REFERENCE TO RELATED APPLICATIONS

This application is the U.S. national stage of PCT/JP2017/012659 filed Mar. 28, 2017, which claims priority of Japanese Patent Application No. JP 2016-082698 filed Apr. 18, 2016.

TECHNICAL FIELD

The present disclosure relates to a relay device that is constituted as a peripheral device of electrical storage units and to an in-vehicle system that uses the relay device.

BACKGROUND

JP 2012-130108A discloses an example of a power source device for in-vehicle use. The power source device disclosed in JP 2012-130108A is provided with a lead battery and a lithium battery, and a power supply line is provided as a power path between the lead battery and the lithium battery. Two MOSFETs for switching between energizing and breaking this power supply line are provided. This power source device performs control such that the SoC (State of Charge) of the lithium battery is in an optimal range, by switching ON/OFF of the MOSFETs according to the SoC during non-regeneration (during idling, acceleration, normal driving, etc.), for example.

The system of JP 2012-130108A is a system that uses a relay to switch two batteries between being energized and de-energized, although, with such a system, in the case where an anomaly occurs in one of the power supply systems, for example, the other power supply system is also affected by that anomaly, and, as a result, there is concern about a situation arising in which an appropriate operating voltage is no longer supplied to either power supply system.

For example, in the system of JP 2012-130108A, an alternator is connected to a power line on the main battery (lead battery) side, and in the case where the charge of the sub-battery (lithium battery) is insufficient, the relay can be maintained in an ON state, and the sub-battery can be charged by the power supply from the alternator. However, during charging of the sub-battery, there is full electrical continuity between the main battery and the sub-battery due to the relay being ON, and thus when a ground fault occurs in the power supply system on one side of the relay, the other side of the relay will also be affected, and the power supply system on the other side will experience a voltage drop. For example, when a ground fault occurs in proximity to the sub-battery (lithium battery) when the relay is ON and the output voltage of the sub-battery drops, the output voltage of the main battery will also instantly drop. In other words, since the battery voltage instantly drops in both power supply systems, an appropriate operating voltage can also no longer be supplied to a load from either power supply system.

The present disclosure was made based on the above circumstances, and an object thereof is to provide a relay device that is able to supply a charging current to at least two electrical storage units from a power generator, and that can, in the case where an anomaly occurs on one electrical storage unit side, suppress the influence that the anomaly exerts on the other electrical storage unit side, and an in-vehicle system that uses such a relay device.

SUMMARY

A relay device of the present disclosure includes a power generator-side conduction path electrically connected to a power generator and a first electrical storage unit-side conduction path serving as a path between the power generator-side conduction path and a first electrical storage unit. A second electrical storage unit-side conduction path serves as a path between the power generator-side conduction path and a second electrical storage unit. A relay unit including a first switch unit is provided on the first electrical storage unit-side conduction path and a second switch unit provided on the second electrical storage unit-side conduction path, and configured to break electrical continuity between the first electrical storage unit and the second electrical storage unit when the first switch unit and the second switch unit are OFF. A control unit is configured to perform control for turning OFF the second switch unit when the first switch unit is ON, and turning OFF the first switch unit when the second switch unit is ON. A first detection unit configured to detect at least a voltage value of the first electrical storage unit-side conduction path. A second detection unit configured to detect at least a voltage value of the second electrical storage unit-side conduction path. Wherein the control unit does not turn ON the first switch unit and the second switch unit at the same time during charging by the power generator, turns OFF the first switch unit in a case where a detection value detected by the first detection unit when the first switch unit is ON becomes less than or equal to a first short circuit determination threshold value, and turns OFF the second switch unit in a case where a detection value detected by the second detection unit when the second switch unit is ON becomes less than or equal to a second short circuit determination threshold value.

Advantageous Effects

In the present disclosure, a power generator-side conduction path is electrically connected to a power generator, a first electrical storage unit-side conduction path is provided as a path between the power generator-side conduction path and a first electrical storage unit, a second electrical storage unit-side conduction path is provided as a path between the power generator-side conduction path and a second electrical storage unit, a first switch unit is provided on the first electrical storage unit-side conduction path, and a second switch unit is provided on the second electrical storage unit-side conduction path. Adopting such a configuration enables a charging current to be supplied from the power generator to the first electrical storage unit, at least when the first switch is ON, and a charging current to be supplied from the power generator to the second electrical storage unit, at least when the second switch is ON. In other words, a device that is able to supply a charging current to at least two electrical storage units from a power generator is realized. Furthermore, a control unit is configured to perform control to turn OFF the second switch unit when the first switch unit is ON, and to turn OFF the first switch unit when the second switch unit is ON. In other words, a configuration is adopted in which the first switch unit and the second switch unit are not turned ON at the same time, and thus even if an anomaly occurs in the power supply system on the first electrical storage unit side or the second electrical storage unit side, a switch unit in an OFF state will, without fail, be interposed on the path between the first electrical storage unit and the second electrical storage unit. Therefore, the influence that an anomaly in the power supply system on one side exerts on the power supply system on other side can be suppressed.

Furthermore, with this configuration, in the case where a ground fault occurs on the power generator-side conduction path when the first switch unit is ON, the voltage on the second electrical storage unit side can be stably maintained since the second switch unit is OFF, and the first switch unit can be turned OFF when the current value or voltage value of the first electrical storage unit-side conduction path falls in the first anomaly range in response to the occurrence of the ground fault, thus enabling current to be prevented from flowing from the first electrical storage unit to the position where the ground fault has occurred. In the case where a ground fault occurs on the power generator-side conduction path when the second switch unit is ON, the voltage on the first electrical storage unit side can be stably maintained since the first switch unit is OFF, and the second switch unit can be turned OFF when the current value or voltage value of the second electrical storage unit-side conduction path falls in the second anomaly range in response to the occurrence of the ground fault, thus enabling current to be prevented from flowing from the second electrical storage unit to the position where the ground fault has occurred.

DETAILED DESCRIPTION OF PREFERRED EMBODIMENTS

Figure 1:
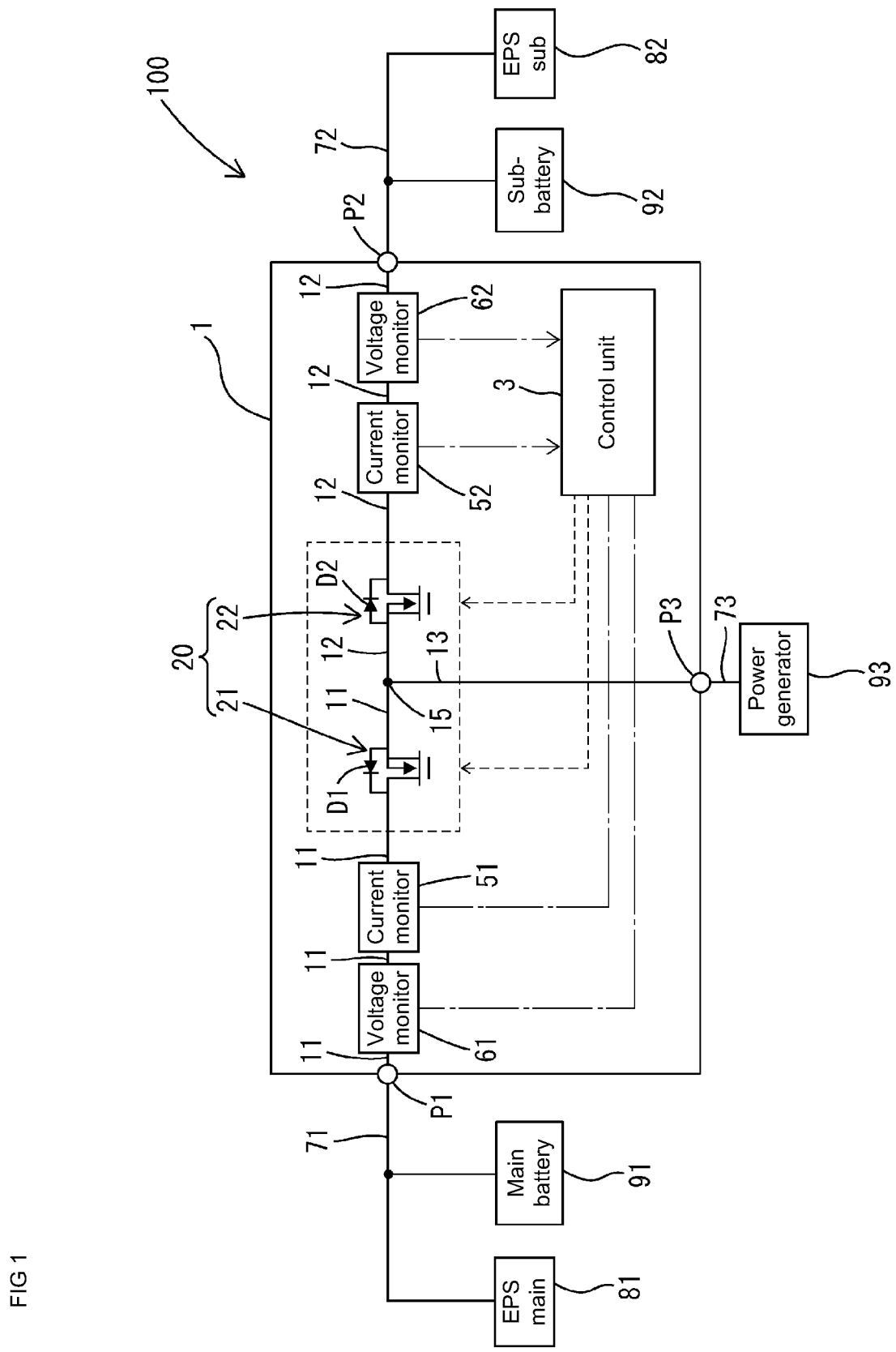
FIG. 1 is a circuit diagram schematically illustrating a power source system for in-vehicle use provided with a relay device according to a first embodiment.

In the present disclosure, the first switch unit may include a first MOSFET, the second switch unit may include a second MOSFET, a body diode of the first MOSFET may be electrically connected at an anode to the power generator, and may be electrically connected at a cathode to the first electrical storage unit, and a body diode of the second MOSFET may be electrically connected at an anode to the power generator, and may be electrically connected at a cathode to the second electrical storage unit.

According to this configuration, a large current can be prevented from flowing from the electrical storage units to the power generator-side conduction path via the body diodes in the case where a ground fault occurs on the power generator-side conduction path, with MOSFETs being disposed as the first switch unit and the second switch unit.

The first switch unit may have two MOSFETs whose body diodes are oriented in opposite directions to each other. The second switch unit may have two MOSFETs whose body diodes are oriented in opposite directions to each other.

With this configuration, bidirectional energization is interrupted in the first switch unit when the two MOSFETs constituting the first switch unit are OFF. Also, bidirectional energization is interrupted in the second switch unit when the two MOSFETs constituting the second switch unit are OFF. By adopting such a configuration, in the case where a ground fault occurs further on the first electrical storage unit-side than the first switch unit or further on the second electrical storage unit-side than the second switch unit, charging of the side on which the ground fault has not occurred can be performed. For example, in the case where a ground fault occurs at a position further on the first electrical storage unit side than the first switch unit when the first switch unit is ON, energization between both electrical storage units and between each electrical storage unit and the power generator can be reliably interrupted by turning OFF the first switch unit. Thereafter, in the case of charging the second electrical storage unit, the second electrical storage unit can be charged while preventing inflow of current from the power generator to the ground fault portion on the first electrical storage unit side, by turning ON the second switch unit while maintaining the first switch unit in an OFF state. Similarly, in the case where a ground fault occurs at a position further on the second electrical storage unit side than the second switch unit when the second switch unit is ON, energization between both electrical storage units and between each electrical storage unit and the power generator can be reliably interrupted by turning OFF the second switch unit. Thereafter, in the case of charging the first electrical storage unit, the first electrical storage unit can be charged while preventing inflow of current from the power generator to the ground fault portion on the second electrical storage unit side, by turning ON the first switch unit while maintaining the second switch unit in an OFF state. In this way, whichever side a ground fault occurs on, it is possible to charge the electrical storage unit on the side on which the ground fault did not occur.

In the present disclosure may be configured as an in-vehicle system having a relay box to which are connected a first wiring part electrically connected to the first electrical storage unit, a second wiring part electrically connected to a first load that receives power from the first electrical storage unit when the first switch unit and the second switch unit are OFF, and a third wiring part electrically connected to a second load that receives power from the second electrical storage unit when the first switch unit and the second switch unit are OFF, and the relay device according to any of the abovementioned configurations. Also, the relay device may be disposed inside or outside the relay box, the power generator-side conduction path of the relay device may be electrically connected to a wiring part from the power generator, and the second electrical storage unit-side conduction path of the relay device may be electrically connected to a wiring part from the second electrical storage unit.

Such an in-vehicle system enables the wiring parts respectively connected to the first electrical storage unit, the second electrical storage unit, the power generator, the first load and the second load and the relay device to be disposed more efficiently within the vehicle by suppressing the number of wirings.

First Embodiment

Hereinafter, a first embodiment that embodies the present disclosure will be described.

The in-vehicle system 100 shown in FIG. 1 is constituted as a power source system for in-vehicle use provided with a plurality of power sources (first electrical storage unit 91 and second electrical storage unit 92). A relay device 1 forms part of the in-vehicle system 100.

Hereinafter, as an example of the in-vehicle system 100, a configuration provided with a main load 81, which is the first load, and a sub-load 82, which is the second load and in which the main load 81 and the sub-load 82 have similar functions will be described as a representative example. This is, however, merely a representative example, and application of the relay device 1 is not limited to only this configuration.

The main load 81 is an electric power steering system, for example, and forms a configuration in which electrical components such as a motor operate through receiving power supply from the first electrical storage unit 91. The sub-load 82 is an electric power steering system having a configuration and functions equivalent to the main load 81. The in-vehicle system 100 is constituted as a system that can, in the case where an anomaly occurs in the main load 81, maintain the functions of the main load 81 even at the time of an anomaly in the main load 81, by operating the sub-load 82 instead of the main load 81.

The first electrical storage unit 91 is a power source unit that can supply power to the main load 81, and is constituted by a well-known power source such as a lead battery, for example. The first electrical storage unit 91 is also referred to as a main battery. The second electrical storage unit 92 is a power source unit that can supply power to the sub-load 82, and is constituted by a well-known power source such as a lithium ion battery or an electric double layer capacitor, for example. The second electrical storage unit 92 is also referred to a sub-battery. A power generator 93 is constituted as a well-known alternator.

The first electrical storage unit 91 and the main load 81 are connected to a wiring part 71 provided outside the relay device 1. The wiring part 71 is connected to a first electrical storage unit-side conduction path 11 discussed later, and an output voltage of the first electrical storage unit 91 is applied to the wiring part 71. The second electrical storage unit 92 and the sub-load 82 are connected to a wiring part 72 provided outside the relay device 1. The wiring part 72 is connected to a second electrical storage unit-side conduction path 12 discussed later, and an output voltage of the second electrical storage unit 92 is applied to the wiring part 72. The power generator 93 is connected to a wiring part 73 provided outside the relay device 1. The wiring part 73 is connected to a power generator-side conduction path 13 discussed later, and an output voltage from the power generator 93 is applied to the wiring part 73.

The first electrical storage unit 91 and the second electrical storage unit 92 are charged by power produced by power generation of the power generator 93. Note that the charging operation on the first electrical storage unit 91 and the second electrical storage unit 92 and a protection operation when an anomaly occurs will be discussed later.

The relay device 1 is provided with the first electrical storage unit-side conduction path 11, the second electrical storage unit-side conduction path 12, the power generator-side conduction path 13, a relay unit 20, a first current detection unit 51, a second current detection unit 52, a first voltage detection unit 61, a second voltage detection unit 62, a control unit 3, and the like.

The power generator-side conduction path 13 is a conduction path electrically connected to the power generator 93, and, when sending a charging current from the power generator 93 to the first electrical storage unit 91 or the second electrical storage unit 92, serves as a path for current. The power generator-side conduction path 13 is in electrical continuity with the wiring part 73 to which the output voltage of the power generator 93 is applied, and is in electrical continuity with the terminal on the high potential side of the power generator 93 via this wiring part 73. One end of the power generator-side conduction path 13 is in electrical continuity with a terminal P3 provided through electrical continuity with the wiring part 73 in the relay device 1, and the other end is connected to the first electrical storage unit-side conduction path 11 and the second electrical storage unit-side conduction path 12. Note that, in FIG. 1, reference sign 15 denotes a connecting part of the first electrical storage unit-side conduction path 11, the second electrical storage unit-side conduction path 12, and the power generator-side conduction path 13. The connecting part 15 forms an end of the first electrical storage unit-side conduction path 11, the second electrical storage unit-side conduction path 12, and the power generator-side conduction path 13.

The first electrical storage unit-side conduction path 11 is a conduction path that is electrically connected to the first electrical storage unit 91, and serves as a path between the power generator-side conduction path 13 and the first electrical storage unit 91, and, when sending a charging current from the power generator 93 to the first electrical storage unit 91, serves as a path for current. The first electrical storage unit-side conduction path 11 is in electrical continuity with the wiring part 71 to which the output voltage of the first electrical storage unit 91 is applied, and is in electrical continuity with the terminal on the high potential side of the first electrical storage unit 91 via this wiring part 71. Note that the terminal on the low potential side of the first electrical storage unit 91 is connected to ground, for example. One end of the first electrical storage unit-side conduction path 11 is connected to a terminal P1 provided through electrical continuity with the wiring part 71 in the relay device 1, and the other end is connected to the power generator-side conduction path 13 and the second electrical storage unit-side conduction path 12.

The second electrical storage unit-side conduction path 12 is a conduction path that is electrically connected to the second electrical storage unit 92, and serves as a path between the power generator-side conduction path 13 and the second electrical storage unit 92, and, when sending a charging current from the power generator 93 to the second electrical storage unit 92, serves as a path for current. The second electrical storage unit-side conduction path 12 is in electrical continuity with the wiring part 72 to which the output voltage of the second electrical storage unit 92 is applied, and is in electrical continuity with the terminal on the high potential side of the second electrical storage unit 92 via this wiring part 72. Note that the terminal on the low potential side of the second electrical storage unit 92 is connected to ground, for example. One end of the second electrical storage unit-side conduction path 12 is connected to a terminal P2 provided through electrical continuity with the wiring part 72 in the relay device 1, and the other end is connected to the power generator-side conduction path 13 and the first electrical storage unit-side conduction path 11.

The relay unit 20 is provided with a first switch unit 21 provided on the first electrical storage unit-side conduction path 11 and a second switch unit 22 provided on the second electrical storage unit-side conduction path 12, and forms a configuration that breaks electrical continuity between the first electrical storage unit 91 and the second electrical storage unit 92 when the first switch unit 21 and the second switch unit 22 are OFF.

The first switch unit 21 corresponds to the first MOSFET, and is, specifically, constituted as an N-channel MOSFET. The drain of the first switch unit 21 is electrically connected to the high potential-side terminal of the first electrical storage unit 91, and the source of the first switch unit 21 is electrically connected to the high potential-side terminal of the power generator 93. The output voltage of the first electrical storage unit 91 is applied to the drain of the first switch unit 21. When the power generator 93 is operating, the output voltage of the power generator 93 is applied to the source of the first switch unit 21. A body diode D1 of the first switch unit 21 is in electrical continuity at an anode with the high potential-side terminal of the power generator 93, and is in electrical continuity at a cathode with the high potential-side terminal of the first electrical storage unit 91. An ON signal and an OFF signal from the control unit 3 are input to the gate of the first switch unit 21. The first switch unit 21 turns ON when the ON signal from the control unit 3 is input to the gate, and turns OFF when the OFF signal from the control unit 3 is input to the gate.

The second switch unit 22 corresponds to the second MOSFET, and is, specifically, constituted as an N-channel MOSFET. The drain of the second switch unit 22 is electrically connected to the high potential-side terminal of the second electrical storage unit 92, and the source of the second switch unit 22 is electrically connected to the high potential-side terminal of the power generator 93. The output voltage of the second electrical storage unit 92 is applied to the drain of the second switch unit 22. When the power generator 93 is operating, the output voltage of the power generator 93 is applied to the source of the second switch unit 22. A body diode D2 of the second switch unit 22 is in electrical continuity at an anode with the high potential-side terminal of the power generator 93, and is in electrical continuity at a cathode with the high potential-side terminal of the second electrical storage unit 92. An ON signal and an OFF signal from the control unit 3 are input to the gate of the second switch unit 22. The second switch unit 22 turns ON when the ON signal from the control unit 3 is input to the gate, and turns OFF when the OFF signal from the control unit 3 is input to the gate.

The first current detection unit 51 is constituted as a well-known current detection circuit (current monitor). The first current detection unit 51 outputs the value of current flowing through the first electrical storage unit-side conduction path 11 as a detection value, and the current value detected by the first current detection unit 51 is input to the control unit 3. Specifically, the first current detection unit 51 detects the current value of a position, on the first electrical storage unit-side conduction path 11, that is further on the first electrical storage unit 91 side than the first switch unit 21.

The first voltage detection unit 61 is constituted as a well-known voltage detection circuit (voltage monitor). The first voltage detection unit 61 outputs the voltage value of the first electrical storage unit-side conduction path 11 as a detection value, and the voltage value detected by the first voltage detection unit 61 is input to the control unit 3. Specifically, the first voltage detection unit 61 detects the voltage value of a position, on the first electrical storage unit-side conduction path 11, that is further on the first electrical storage unit 91 side than the first switch unit 21.

The second current detection unit 52 is constituted as a well-known current detection circuit (current monitor). The second current detection unit 52 outputs the value of current flowing through the second electrical storage unit-side conduction path 12 as a detection value, and the current value detected by the second current detection unit 52 is input to the control unit 3. Specifically, the second current detection unit 52 detects the current value of a position, on the second electrical storage unit-side conduction path 12, that is further on the second electrical storage unit 92 side than the second switch unit 22.

The second voltage detection unit 62 is constituted as a well-known voltage detection circuit (voltage monitor). The second voltage detection unit 62 outputs the voltage value of the second electrical storage unit-side conduction path 12 as a detection value, and the voltage value detected by the second voltage detection unit 62 is input to the control unit 3. Specifically, the second voltage detection unit 62 detects the voltage value of a position, on the second electrical storage unit-side conduction path 12, that is further on the second electrical storage unit 92 side than the second switch unit 22.

The first current detection unit 51 and the first voltage detection unit 61 correspond to an example of the first detection unit, and have a function of detecting the current value or voltage value of the first electrical storage unit-side conduction path 11. The second current detection unit 52 and the second voltage detection unit 62 correspond to an example of the second detection unit, and have a function of detecting the current value or voltage value of the second electrical storage unit-side conduction path 12.

The control unit 3 has a microcomputer provided with a CPU, a ROM, a RAM, an A/D convertor and the like, for example. The detection value of the first current detection unit 51, the detection value of the first voltage detection unit 61, the detection value of the second current detection unit 52 and the detection value of the second voltage detection unit 62 are input to the control unit 3. Each detection value input to the control unit 3 is converted to a digital value by the A/D convertor in the control unit 3. The control unit 3 controls ON/OFF of the first switch unit 21 and the second switch unit 22 of the relay unit 20, based on these detection values.

Here, basic operations of the relay device 1 at the time of normal operation will be described.

Figures 2, 3:
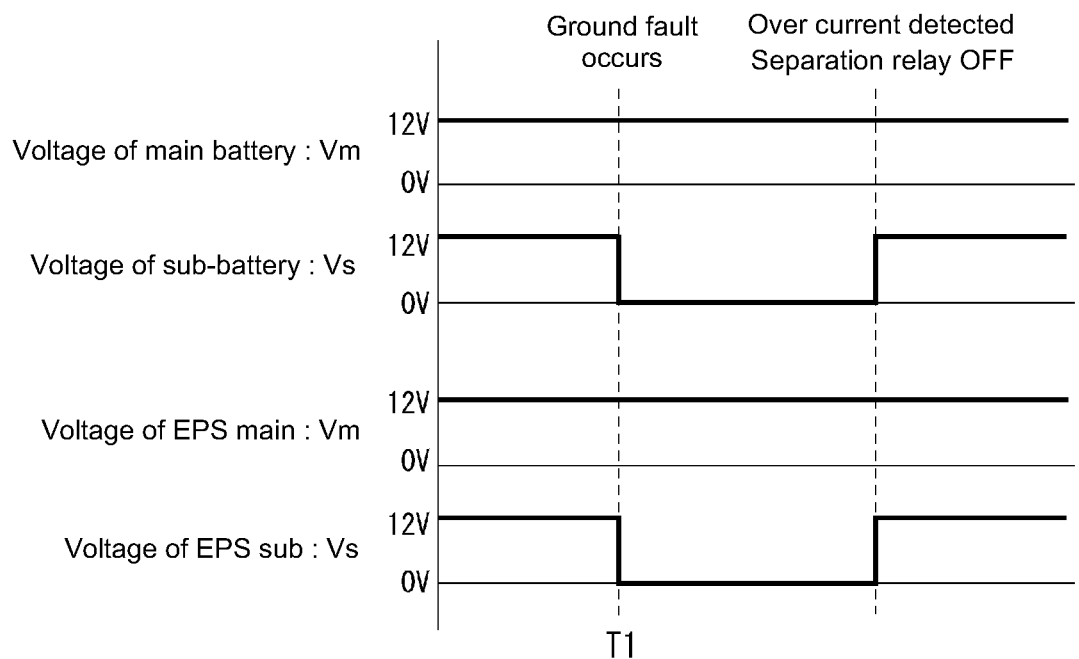
FIG. 2 is a diagram that relates to charging control in the power source system of FIG. 1, and shows the relationship between a charging target and first and second switches.
FIG. 3 is a timing chart illustrating a relationship between a voltage on a first electrical storage unit (main battery) side, a voltage on a second electrical storage unit (sub-battery) side, a voltage that is applied to a load on the first electrical storage unit (main battery) side, and a voltage that is applied to the load on the second electrical storage unit (sub-battery) side, in the case where a ground fault occurs on the second electrical storage unit (sub-battery) side in the power source system of FIG. 1.

In the relay device 1, ON/OFF of the first switch unit 21 and the second switch unit 22 is controlled by the control unit 3. Specifically, as shown in FIG. 2, ON/OFF of the first switch unit 21 and the second switch unit 22 is controlled so as to selectively charge only one of the electrical storage units out of the first electrical storage unit 91 and the second electrical storage unit 92.

For example, in the case where the detection value of the first voltage detection unit 61 is less than or equal to a predetermined first charge determination threshold value Vth1, and exceeds a first short circuit determination threshold value Va1 discussed later, the charging current from the power generator 93 is supplied to only the first electrical storage unit 91 (main battery) by setting the first electrical storage unit 91 as the charging target, and, at this time, turning ON the first switch unit 21 and turning OFF the second switch unit 22. The first charge determination threshold value Vth1 is a threshold value that is used in determining whether to charge the first electrical storage unit 91, and is greater than the first short circuit determination threshold value Va1 discussed later.

Also, in the case where the detection value of the second voltage detection unit 62 is less than or equal to a predetermined second charge determination threshold value Vth2, and exceeds a second short circuit determination threshold value Va2 discussed later, the charging current from the power generator 93 is supplied to only the second electrical storage unit 92 (sub-battery) by setting the second electrical storage unit 92 as the charging target, and, at this time, turning OFF the first switch unit 21 and turning ON the second switch unit 22. The second charge determination threshold value Vth2 is a threshold value that is used in determining whether to charge the second electrical storage unit 92, and is greater than the second short circuit determination threshold value Va2 discussed later.

Note that, in the case where the detection value of the first voltage detection unit 61 is less than or equal to the first charge determination threshold value Vth1, and the detection value of the second voltage detection unit 62 is less than or equal to the second charge determination threshold value Vth2, the first electrical storage unit 91 may be preferentially charged by turning ON the first switch unit 21 and turning OFF the second switch unit 22, and, after the first electrical storage unit 91 has been charged, the second electrical storage unit 92 may be charged by turning OFF the first switch unit 21 and turning ON the second switch unit 22, for example.

In this way, in the relay device 1, the power generator-side conduction path 13 is electrically connected to the power generator 93, the first electrical storage unit-side conduction path 11 is provided as a path between the power generator-side conduction path 13 and the first electrical storage unit 91, and the second electrical storage unit-side conduction path 12 is provided as a path between the power generator-side conduction path 13 and the second electrical storage unit 92. Also, the first switch unit 21 is provided on the first electrical storage unit-side conduction path 11, and the second switch unit 22 is provided on the second electrical storage unit-side conduction path 12. Adopting such a configuration enables a charging current to be supplied from the power generator 93 to the first electrical storage unit 91 at least when the first switch unit 21 is ON, and a charging current to be supplied from the power generator 93 to the second electrical storage unit 92 at least when the second switch unit 22 is ON. In other words, a charging current can be supplied from the power generator 93 to at least two electrical storage units.

Next, operations of the relay device 1 at the time of an anomaly will be described.

The control unit 3 performs control for when an anomaly has occurred so as to turn OFF the first switch unit 21 in the case where the detection value that is detected by the first current detection unit 51 or the first voltage detection unit 61 when the first switch unit 21 is ON is in the first anomalous range, and to turn OFF the second switch unit 22 in the case where the detection value that is detected by the second current detection unit 52 or the second voltage detection unit 62 when the second switch unit 22 is ON is in the second anomalous range.

Specifically, a first overcurrent determination threshold value Ia1 is set as a threshold value for determining an anomaly of a current value I1 that is detected by the first current detection unit 51. A current value I1 of the first current detection unit 51 in a range greater than or equal to the first overcurrent determination threshold value Ia1 corresponds to the first anomalous range. Also, the first short circuit determination threshold value Va1 and a first overvoltage determination threshold value Vb1 are set as threshold values for determining an anomaly of a voltage value V1 that is detected by the first voltage detection unit 61. The first short circuit determination threshold value Va1 is greater than 0V. The first overvoltage determination threshold value Vb1 is greater than the output voltage of the first electrical storage unit 91 when fully charged, for example. A voltage value V1 of the first voltage detection unit 61 in a range less than or equal to the first short circuit determination threshold value Va1 and greater than or equal to the first overvoltage determination threshold value Vb1 corresponds to the first anomalous range.

Also, a second overcurrent determination threshold value Ia2 is set as a threshold value for determining an anomaly of a current value I2 that is detected by the second current detection unit 52. A current value I2 of the second current detection unit 52 in a range greater than or equal to the second overcurrent determination threshold value Ia2 corresponds to the second anomalous range. Also, the second short circuit determination threshold value Va2 and a second overvoltage determination threshold value Vb2 are set as threshold values for determining an anomaly of a voltage value V2 that is detected by the second voltage detection unit 62. The second short circuit determination threshold value Va2 is greater than 0V. The second overvoltage determination threshold value Vb2 is greater than the output voltage of the second electrical storage unit 92 when fully charged, for example. A voltage value V2 of the second voltage detection unit 62 in a range less than or equal to the second short circuit determination threshold value Va2 and greater than or equal to the second overvoltage determination threshold value Vb2 correspond to the second anomalous range.

The control unit 3 performs a protection operation in the case where an anomaly that results in the voltage value or current value falling in the first anomalous range or second anomalous range occurs during normal control described above. Specifically, in the case where the current value I1 that is detected by the first current detection unit 51 becomes greater than or equal to the first overcurrent determination threshold value Ia1, or where the voltage value V1 that is detected by the first voltage detection unit 61 becomes less than or equal to the first short circuit determination threshold value Va1 or greater than or equal to the first overvoltage determination threshold value Vb1, when the first switch unit 21 is ON and the second switch unit 22 is OFF, the first switch unit 21 is turned OFF. In this case, only the second switch unit 22 is in an OFF state before the anomaly occurs, and the first switch unit 21 and the second switch unit 22 will both be in an OFF state after the anomaly occurs.

Also, in the case where a current value I2 that is detected by the second current detection unit 52 becomes greater than or equal to the second overcurrent determination threshold value Ia2, or where the voltage value V2 that is detected by the second voltage detection unit 62 becomes less than or equal to the second short circuit determination threshold value Va2 or greater than or equal to the second overvoltage determination threshold value Vb2, when the second switch unit 22 is ON and the first switch unit 21 is OFF, the second switch unit 22 is turned OFF. In this case, only the first switch unit 21 is in an OFF state before the anomaly occurs, and the first switch unit 21 and the second switch unit 22 will both be in an OFF state after the anomaly occurs.

In this way, the control unit 3 is configured to perform control to turn OFF the second switch unit 22 when the first switch unit 21 is ON, and to turn OFF the first switch unit 21 when the second switch unit 22 is ON. In other words, a configuration is adopted in which the first switch unit 21 and the second switch unit 22 are not turned ON at the same time, and thus even if an anomaly occurs in the power supply system on the first electrical storage unit 91 side or the second electrical storage unit 92 side, a switch unit in an OFF state will, without fail, be interposed on the path between the first electrical storage unit 91 and the second electrical storage unit 92. Therefore, the influence that an anomaly in the power supply system on one side exerts on the power supply system on other side can be suppressed.

FIG. 3 shows the relationship between the voltage on the first electrical storage unit 91 (main battery) side, the voltage on the second electrical storage unit 92 (sub-battery) side, the voltage that is applied to the load (EPS main) on the first electrical storage unit 91 (main battery) side, and the voltage that is applied to the load (EPS sub) on the second electrical storage unit 92 (sub-battery) side, in the case where a ground fault occurs in the wiring part 72 connected to the second electrical storage unit 92 (sub-battery) side. FIG. 3 shows the case where a ground fault has occurred in the wiring part 72 on the second electrical storage unit 92 (sub-battery) side at a ground fault occurrence time T1, in the case where the first switch unit 21 was changed to an OFF state and the second switch unit 22 was changed to an ON state in the period before time T1. In this case, even if a ground fault occurs in the wiring part 72 (power supply system of the second electrical storage unit 92) at the ground fault occurrence time T1, the first switch unit 21 in an OFF state will, without fail, be interposed between the first electrical storage unit 91 and the second electrical storage unit 92 at the point in time of the ground fault occurrence time T1. In other words, a situation such as where a large current instantly flows from the first electrical storage unit 91 to the wiring part 72 at the point in time at which a ground fault occurs in the wiring part 72 can be avoided, and a drop in the output voltage of the first electrical storage unit 91 can be prevented.

Note that such an effect is similarly produced in the case where a ground fault occurs in the wiring part 71 on the first electrical storage unit 91 (main battery) side in the case where the first switch unit 21 is in an ON state and the second switch unit 22 is in an OFF state.

Figure 7:
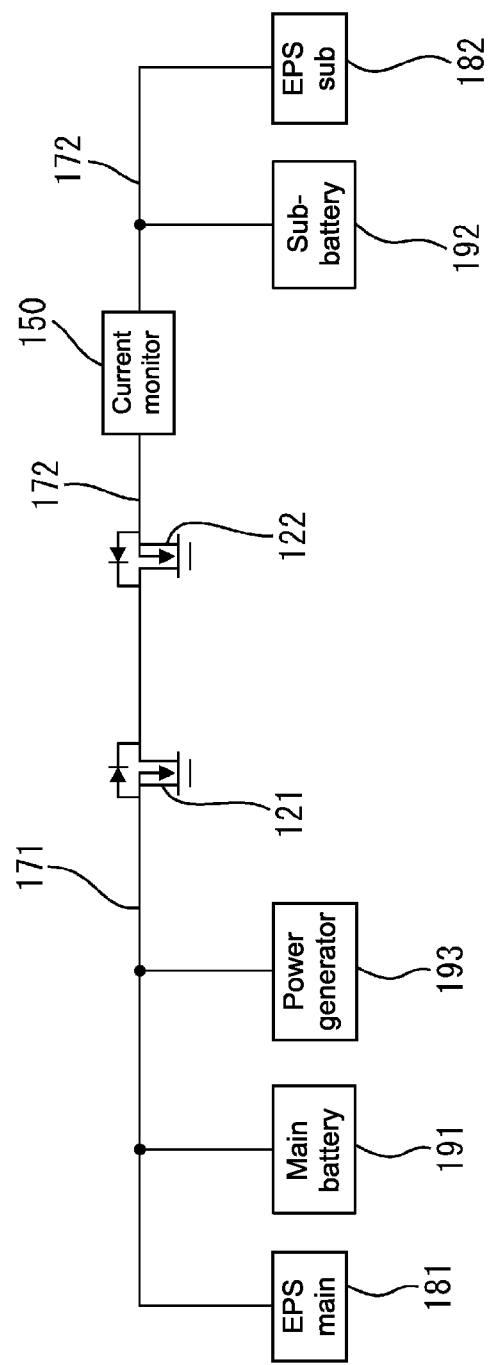
FIG. 7 is a circuit diagram schematically illustrating a power source system for in-vehicle use serving as a comparative example.

Here, the effects of the present configuration will be described in more detail with reference to a comparative example. FIG. 7 illustrates an in-vehicle system serving as a comparative example. In this in-vehicle system, a main battery 191, a power generator 193 and a main load 181 are connected to a wiring 171, and a sub-battery 192 and a sub-load 182 are connected to a wiring 172. MOSFETs 121 and 122 for switching the path connecting the wiring 171 and the wiring 172 between an energized state and a de-energized state are provided between these wirings 171 and 172.

With this configuration, in the case of charging the sub-battery 192, control is performed to switch both of the MOSFETs 121 and 122 to an ON state, using a control circuit which is not shown. Conversely, in the case of not charging the sub-battery 192, control is performed to switch both of the MOSFETs 121 and 122 to an OFF state, using the control circuit which is not shown. With such a configuration, the voltage of the sub-battery 192 instantly drops when a ground fault occurs in the wiring 172 on the sub-battery 192 side at the time of charging the sub-battery 192 with the MOSFETs 121 and 122 maintained in an ON state. Also, a large current flows from the main battery 191 to the wiring 172 side, and the voltage of the main battery 191 also instantly drops.

Figure 8:
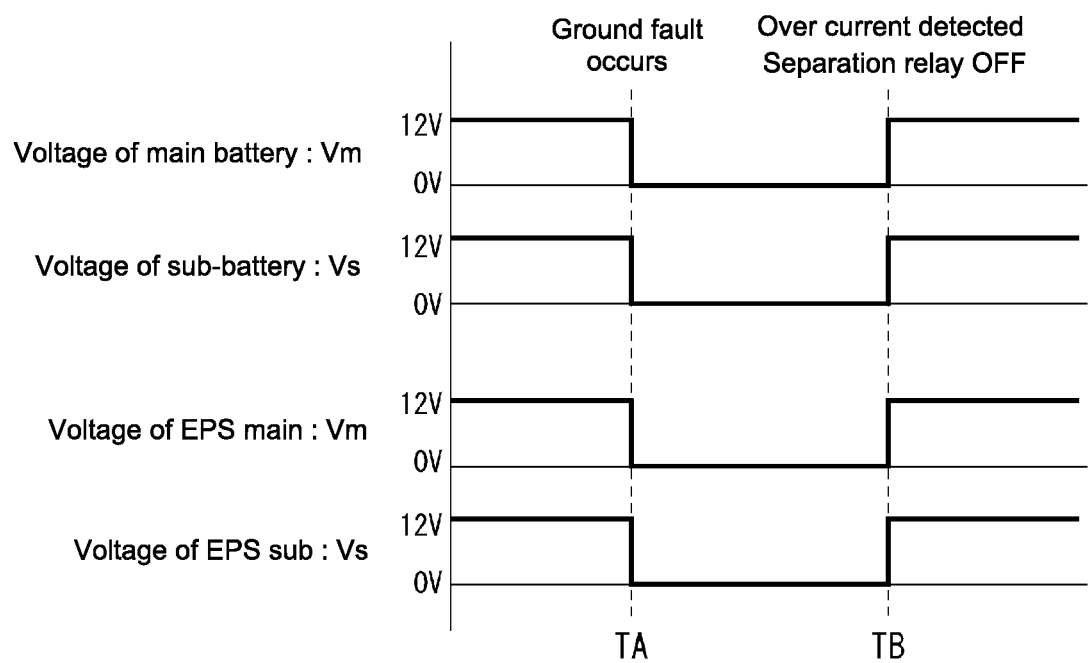
FIG. 8 is a timing chart illustrating a relationship between a voltage on the main battery side, a voltage on the sub-battery side, a voltage that is applied to a load on the main battery side, and a voltage that is applied to the load on the sub-battery side, in the case where a ground fault occurs on the sub-battery side in the configuration of the comparative example in FIG. 7.

With this configuration, a protection operation can also be performed to switch the MOSFETs 121 and 122 to an OFF state in the case where the current value that is detected by the current monitor 150 reaches an anomalous value (overcurrent range), and, as a result of this protection operation, energization between the wiring 171 and the wiring 172 can be interrupted after the occurrence of a ground fault. However, as shown in FIG. 8, it takes time to determine that the current value detected by the current monitor 150 from time TA at which a ground fault occurred is an anomalous value, and, thereafter, it takes time for the MOSFETs 121 and 122 to actually be switched to an OFF state at time TB, and thus the output voltage of the main battery 191 continues to drop during this time. In other words, when a ground fault occurs on the sub-battery 192 side, for a certain period, not only the voltage applied to the load 182 (EPS sub) on the sub-battery 192 side but also the voltage applied to the load 181 (EPS main) on the main battery 191 side will drop. In this way, with the configuration of the comparative example, a period in which neither load is able to operate could possibly arise. In contrast, according to the configuration of the present embodiment described above, even if a ground fault occurs on the second electrical storage unit 92 (sub-battery) side as shown in FIG. 3, the output voltage on the first electrical storage unit 91 (main battery) side can be stably maintained, thus enabling such problems to be resolved.

With the above configuration, in the relay device 1, the first switch unit 21 is constituted as the first MOSFET and the second switch unit 22 is constituted as the second MOSFET. Also, the body diode D1 of the first switch unit 21 (first MOSFET) is configured to be in electrical continuity at an anode with the power generator 93, and to be in electrical continuity at a cathode with the first electrical storage unit 91. The body diode D2 of the second switch unit 22 (second MOSFET) is configured to be in electrical continuity at an anode with the power generator 93, and to be in electrical continuity at a cathode with the second electrical storage unit 92. According to this configuration, a large current can be prevented from flowing from the electrical storage units to the power generator-side conduction path 13 via the body diodes D1 and D2 in the case where a ground fault occurs on the power generator-side conduction path 13, with MOSFETs disposed as the first switch unit 21 and the second switch unit 22.

The relay device 1 has the first current detection unit 51 and the first voltage detection unit 61 that detect the current value and voltage value of the first electrical storage unit-side conduction path 11, and the second current detection unit 52 and the second voltage detection unit 62 that detect the current value and voltage value of the second electrical storage unit-side conduction path 12. The control unit 3 performs control to turn OFF the first switch unit 21 in the case where the detection value that is detected by the first current detection unit 51 or the first voltage detection unit 61 when the first switch unit 21 is ON is in the first anomalous range, and to turn OFF the second switch unit 22 in the case where the detection value that is detected by the second current detection unit 52 or the second voltage detection unit 62 when the second switch unit 22 is ON is in the second anomalous range.

With this configuration, in the case where a ground fault occurs on the power generator-side conduction path 13 when the first switch unit 21 is ON, the voltage on the second electrical storage unit 92 side can be stably maintained since the second switch unit 22 is OFF, and the first switch unit 21 can be turned OFF when the current value or voltage value of the first electrical storage unit-side conduction path 11 falls in the first anomalous range in response to the occurrence of the ground fault, and thus current can be prevented from flowing from the first electrical storage unit 91 to the position where the ground fault has occurred. In the case where a ground fault occurs on the power generator-side conduction path 13 when the second switch unit 22 is ON, the voltage on the first electrical storage unit 91 side can be stably maintained since the first switch unit 21 is OFF, and the second switch unit 22 can be turned OFF when the current value or voltage value of the second electrical storage unit-side conduction path 12 falls in the second anomalous range in response to the occurrence of the ground fault, and thus current can be prevented from flowing from the second electrical storage unit 92 to the position where the ground fault has occurred.

Figure 4:
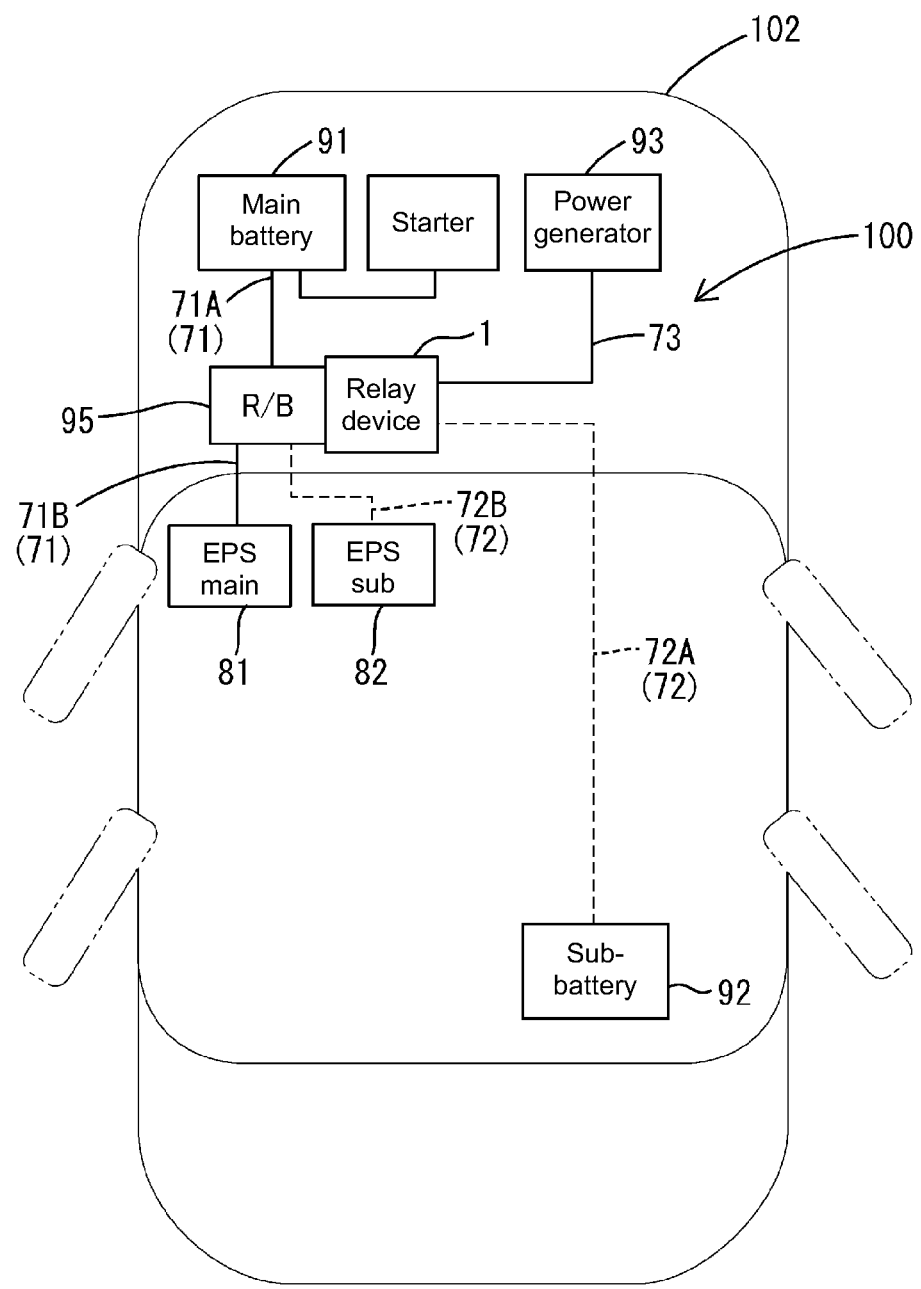
FIG. 4 is an illustrative diagram conceptually showing an exemplary disposition of a relay device and the like within a vehicle.
Figure 5:
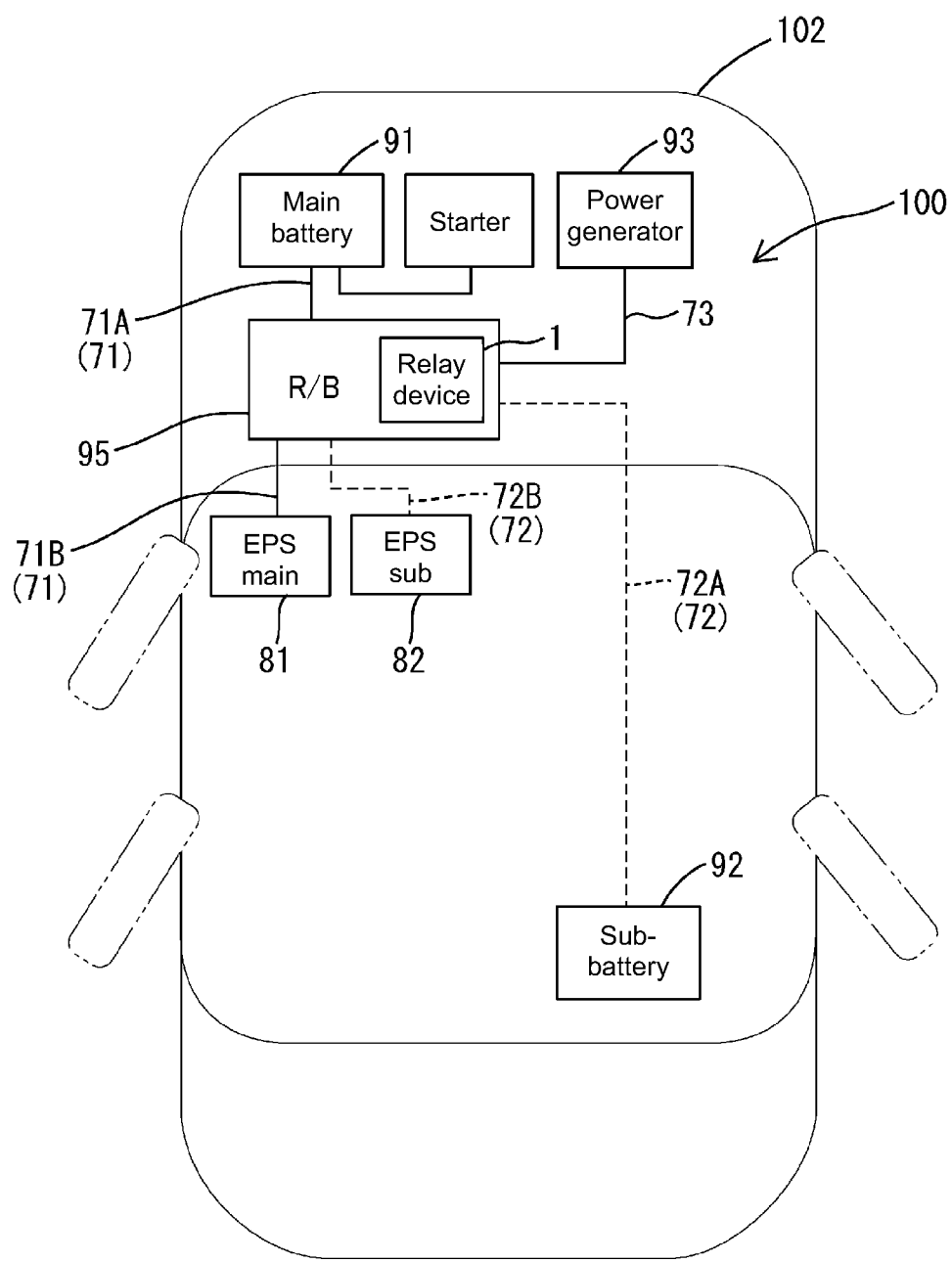
FIG. 5 is an illustrative diagram conceptually showing an exemplary disposition of a relay device and the like within a vehicle that differs from the example in FIG. 4.

FIG. 4 and FIG. 5 show examples in which the in-vehicle system 100 is installed in a vehicle 102.

In the examples of both FIG. 4 and FIG. 5, the first electrical storage unit 91 (main battery), the second electrical storage unit 92 (sub-battery), the main load 81 (EPS main), the sub-load 82 (EPS sub), the power generator 93, the relay device 1 and the like are installed inside the vehicle 102, and a relay box 95, a starter and the like are further installed therein.

In the in-vehicle system 100 of both FIG. 4 or FIG. 5, a first wiring part 71A electrically connected to the first electrical storage unit 91, a second wiring part 71B electrically connected to the main load 81, and a third wiring part 72B electrically connected to the sub-load 82 are connected to the relay box 95. Note that the main load 81 is a load that corresponds to an example of the first load, and is able to receive power from the first electrical storage unit 91 even when the first switch unit 21 and the second switch unit 22 are OFF. The sub-load 82 is a load that corresponds to an example of the second load, and is able to receive power from the second electrical storage unit 92 even when the first switch unit 21 and the second switch unit 22 are OFF. Note that the first wiring part 71A and the second wiring part 71B form part of the abovementioned wiring part 71, and the third wiring part 72B and a fourth wiring part 72A form part of the abovementioned wiring part 72.

In the example of FIG. 4, the relay device 1 is disposed outside the relay box 95 (e.g., in a position near the relay box 95), and the relay device 1 and the relay box 95 are connected by a wiring part. The wiring part 73 from the power generator 93 is connected at an end to the relay device 1, and is electrically connected to the power generator-side conduction path 13 that is disposed inside this relay device 1. The wiring part (fourth wiring part 72A) from the second electrical storage unit 92 is connected at an end to the relay device 1, and is electrically connected to the second electrical storage unit-side conduction path 12 that is disposed inside this relay device 1. According to such an in-vehicle system 100, the wiring parts respectively connected to the first electrical storage unit 91, the second electrical storage unit 92, the power generator 93, the main load 81 (first load) and the sub-load 82 (second load) and the relay device 1 can be disposed more efficiently within the vehicle 102 by suppressing the number of wirings. Also, design changes such as changing the position of the relay device 1 can be readily addressed. Note that such a configuration is also applicable to an in-vehicle system 200 discussed later.

In the example of FIG. 5, the relay device 1 is disposed inside the relay box 95, and the wiring part 73 from the power generator 93 is connected at an end within the relay box 95, and is electrically connected to the power generator-side conduction path 13 that is disposed in the relay device 1 within the relay box 95. The wiring part (fourth wiring part 72A) from the second electrical storage unit 92 is connected at an end within the relay box 95, and is electrically connected to the second electrical storage unit-side conduction path 12 that is disposed in the relay device 1 within the relay box 95. Even with such an in-vehicle system 100, the wiring parts respectively connected to the first electrical storage unit 91, the second electrical storage unit 92, the power generator 93, the main load 81 (first load) and the sub-load 82 (second load) and the relay device 1 can be disposed more efficiently within the vehicle 102 by suppressing the number of wirings. Note that such a configuration can also be applied to the in-vehicle system 200 discussed later.

Second Embodiment

Next, a second embodiment will be described.

Figure 6:
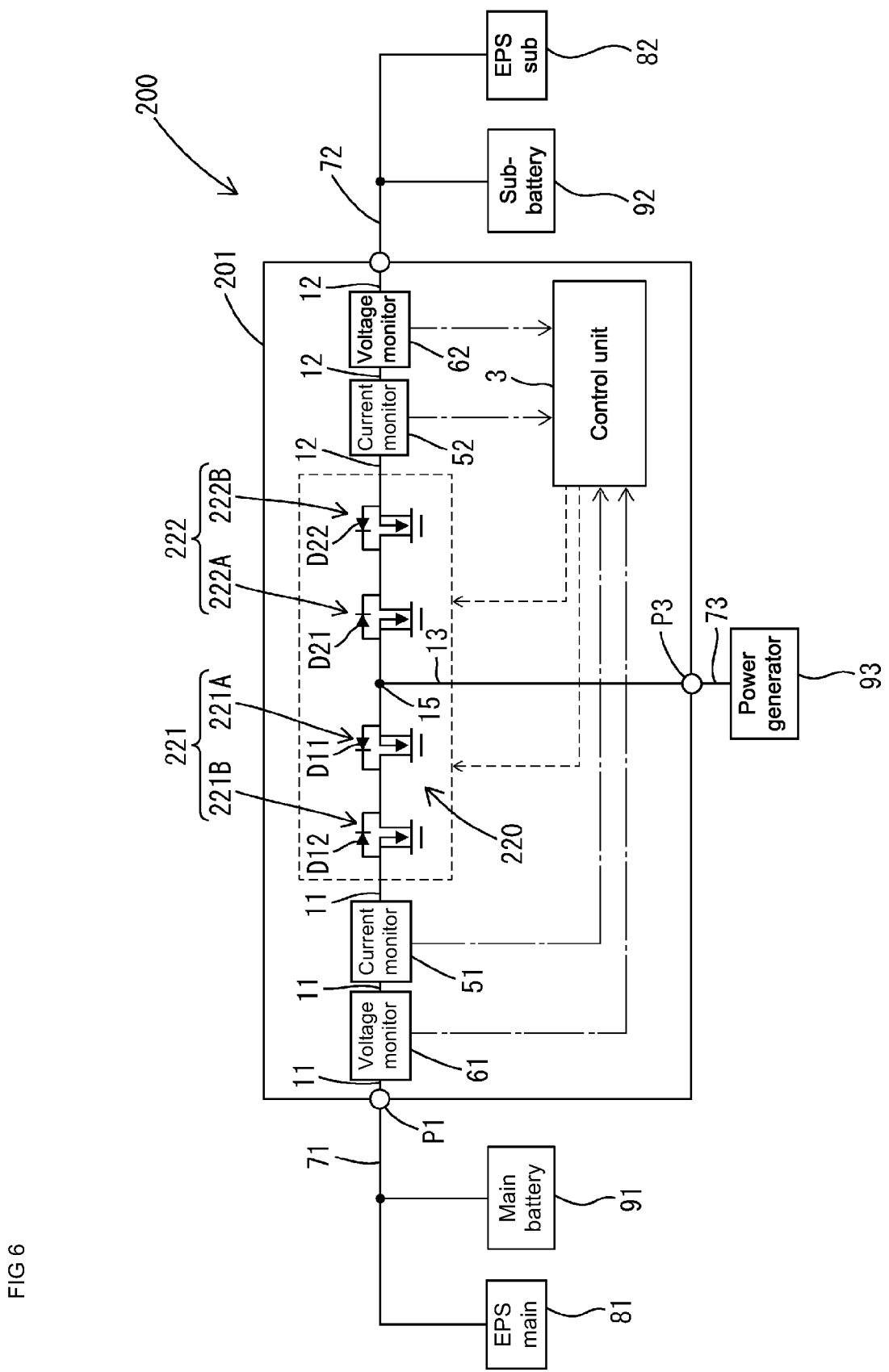
FIG. 6 is a circuit diagram schematically illustrating a power source system for in-vehicle use provided with a relay device according to a second embodiment.

The circuit configuration of the in-vehicle system 200 shown in FIG. 6 differs from the in-vehicle system 100 of the first embodiment only in that the relay device 1 of the in-vehicle system 100 of the first embodiment is replaced by a relay device 201. The relay device 201 differs from the relay device 1 of the first embodiment only in that the first switch unit 21 is changed to a first switch unit 221, and the second switch unit 22 is changed to a second switch unit 222. Hereinafter, portions of the in-vehicle system 200 that differ from the system 100 of the first embodiment will be described in detail, and portions that are the same as the system 100 of the first embodiment will be given the same reference signs as the system 100, and a detailed description thereof will be omitted.

In the relay device 201 that is provided in the in-vehicle system 200 of the second embodiment, the first switch unit 221 is constituted by two MOSFETs 221A and 221B whose body diodes are oriented in opposite directions to each other. That is, a body diode D11 of the MOSFET 221A and a body diode D12 of the MOSFET 221B are oriented in opposite directions, and bidirectional energization is interrupted when the MOSFETs 221A and 221B are OFF. Also, the second switch unit 222 is constituted by two MOSFETs 222A and 222B whose body diodes are oriented in opposite directions to each other. That is, a body diode D21 of the MOSFET 222A and a body diode D22 of the MOSFET 222B are oriented in opposite directions, and bidirectional energization is interrupted when the MOSFETs 222A and 222B are OFF.

Even with this configuration, the control unit 3 performs normal control with a similar method to the first embodiment. For example, in the case where the detection value of the first voltage detection unit 61 is less than or equal to the first charge determination threshold value Vth1 and exceeds the first short circuit determination threshold value Va1, a charging current from the power generator 93 is supplied to only the first electrical storage unit 91 (main battery), by setting the first electrical storage unit 91 as the charging target, and, at this time, turning ON the first switch unit 221 and turning OFF the second switch unit 222. Also, in the case where the detection value of the second voltage detection unit 62 is less than or equal to the second charge determination threshold value Vth2 and exceeds the second short circuit determination threshold value Va2, a charging current from the power generator 93 (sub-battery) is supplied to only the second electrical storage unit 92, by setting the second electrical storage unit 92 as the charging target, and, at this time, turning OFF the first switch unit 221 and turning ON the second switch unit 222.

Even with this configuration, the control unit 3 performs control for when an anomaly has occurred with a similar method to the first embodiment. For example, in the case where the current value I1that is detected by the first current detection unit 51 becomes greater than or equal to the first overcurrent determination threshold value Ia1, or where the voltage value V1that is detected by the first voltage detection unit 61 becomes less than or equal to the first short circuit determination threshold value Va1or greater than or equal to the first overvoltage determination threshold value Vb1, when the first switch unit 221 is ON and the second switch unit 222 is OFF, the first switch unit 221 is turned OFF. In this case, only the second switch unit 222 is in an OFF state before the anomaly occurs, and the first switch unit 221 and the second switch unit 222 will both be in an OFF state after the anomaly occurs. For example, in the case where a ground fault occurs at a position further on the first electrical storage unit 91 side than the first switch unit 221 when the MOSFETs 221A and 221B are ON, the voltage value V1that is detected by the first voltage detection unit 61 becomes less than or equal to the first short circuit determination threshold value Va1, thus enabling the first switch unit 221 to be turned OFF, and energization between both electrical storage units and between each electrical storage unit and the power generator to be reliably interrupted.

In this way, in the case of charging the second electrical storage unit 92 after the first switch unit 221 and the second switch unit 222 have both been changed to an OFF state, a charging current can be supplied from the power generator 93 to the second electrical storage unit 92 by turning ON the second switch unit 222. At this time, since the two MOSFETs 221A and 221B of the first switch unit 221 whose body diodes are oriented in opposite direction to each other are both in an OFF state, current does not flow from the power generator 93 to the first electrical storage unit 91 side. Also, at the time of charging the second electrical storage unit 92 after the occurrence of such an anomaly, the first switch unit 221 may continue to maintain an OFF state, and ON/OFF operation of the first switch unit 221 is unnecessary Also, under normal control, in the case where the current value I2that is detected by the second current detection unit 52 becomes greater than or equal to the second overcurrent determination threshold value Ia2, or where the voltage value V2 that is detected by the second voltage detection unit 62 becomes less than or equal to the second short circuit determination threshold value Va2 or greater than or equal to the second overvoltage determination threshold value Vb2, when the second switch unit 222 is ON and the first switch unit 221 is OFF, the second switch unit 222 is turned OFF. In this case, only the first switch unit 221 is in an OFF state before the anomaly occurs, and the first switch unit 221 and the second switch unit 222 will both be in an OFF state after the anomaly occurs. For example, in the case where a ground fault occurs at a position further on the second electrical storage unit 92 side than the second switch unit 222 when the MOSFETs 222A and 222B are ON, the voltage value V2 that is detected by the second voltage detection unit 62 becomes less than or equal to the second short circuit determination threshold value Va2, thus enabling the second switch unit 222 to be turned OFF, and energization between both electrical storage units and between each electrical storage unit and the power generator to be reliably interrupted.

In this way, in the case of charging the first electrical storage unit 91 after the first switch unit 221 and the second switch unit 222 have both been changed to an OFF state, a charging current can be supplied from the power generator 93 to the first electrical storage unit 91 by turning ON the first switch unit 221. At this time, since the two MOSFETs 222A and 222B of the second switch unit 222 whose body diodes are oriented in opposite directions to each other are both in an OFF state, current does not flow from the power generator 93 to the second electrical storage unit 92 side. Also, at the time of charging the first electrical storage unit 91 after the occurrence of such an anomaly, the second switch unit 222 may continue to maintain an OFF state, and ON/OFF operation of the second switch unit 222 is unnecessary.

Even with a configuration of the second embodiment such as described above, similar effects to the first embodiment are obtained.

Furthermore, with this configuration, the first switch unit 221 has the two MOSFETs 221A and 221B whose body diodes are oriented in opposite directions to each other. The second switch unit 222 has the two MOSFET 222A and 222B whose body diodes are oriented in opposite directions to each other. According to this configuration, bidirectional energization is interrupted in the first switch unit 221 when the two MOSFETs 221A and 221B constituting the first switch unit 221 are OFF. Also, bidirectional energization is interrupted in the second switch unit 222 when the two MOSFETs 222A and 222B constituting the second switch unit 222 are OFF. By adopting such a configuration, in the case where a ground fault occurs further on the first electrical storage unit 91 side than the first switch unit 221 or further on the second electrical storage unit 92 side than the second switch unit 222, charging of the side on which the ground fault has not occurred can be performed.

Other Embodiments

The present disclosure is not limited to the embodiments illustrated with the above description and drawings, and embodiments such as the following, for example, are also embraced within the technical scope of the disclosure.

In the abovementioned embodiments, actuators (e.g., electric power-steering systems) that require redundancy were illustrated as a main load 81 and a sub-load 82, but other examples are possible. For example, the main load 81 may be constituted as a sensing device such as a radar, an ultrasonic sensor or a camera, and the sub-load 82 may be constituted as a sensing device for backup having similar functions to the main load. Also, the load that is connected to the first electrical storage unit 91 side may have different functions from the load that is connected to the second electrical storage unit 92 side.

In the abovementioned embodiments, an example in which the first switch unit is constituted by one or a plurality of MOSFETs was shown, but the first switch unit may be constituted by a semiconductor switch, a mechanical relay or the like other than a MOSFET. Also, an example was illustrated in which the second switch unit is constituted by one or a plurality of MOSFETs, but the second switch unit may be constituted by a semiconductor switch, a mechanical relay or the like other than a MOSFET.

The invention claimed is:

1. A relay device comprising:
a power generator-side conduction path electrically connected to a power generator;
a first electrical storage unit-side conduction path serving as a path between the power generator-side conduction path and a first electrical storage unit;
a second electrical storage unit-side conduction path serving as a path between the power generator-side conduction path and a second electrical storage unit;
a relay unit including a first switch unit provided on the first electrical storage unit-side conduction path and a second switch unit provided on the second electrical storage unit-side conduction path, and configured to break electrical continuity between the first electrical storage unit and the second electrical storage unit when the first switch unit and the second switch unit are OFF;
a control unit configured to perform control for turning OFF the second switch unit when the first switch unit is ON, and turning OFF the first switch unit when the second switch unit is ON;
a first detection unit configured to detect at least a voltage value of the first electrical storage unit-side conduction path; and
a second detection unit configured to detect at least a voltage value of the second electrical storage unit-side conduction path,
wherein the control unit:
does not turn ON the first switch unit and the second switch unit at the same time during charging by the power generator, and
turns OFF the first switch unit in a case where a detection value detected by the first detection unit when the first switch unit is ON becomes less than or equal to a first short circuit determination threshold value, and turns OFF the second switch unit in a case where a detection value detected by the second detection unit when the second switch unit is ON becomes less than or equal to a second short circuit determination threshold value.

2. The relay device according to claim 1,
wherein the first switch unit includes a first MOSFET, the second switch unit includes a second MOSFET, a body diode of the first MOSFET is electrically connected at an anode to the power generator, and is electrically connected at a cathode to the first electrical storage unit, and
a body diode of the second MOSFET is electrically connected at an anode to the power generator, and is electrically connected at a cathode to the second electrical storage unit.

3. The relay device according to claim 2, wherein the first switch unit has two MOSFETs whose body diodes are oriented in opposite directions to each other, and the second switch unit has two MOSFETs whose body diodes are oriented in opposite directions to each other.

4. The relay device according to claim 1,
wherein the first switch unit has two MOSFETs whose body diodes are oriented in opposite directions to each other, and
the second switch unit has two MOSFETs whose body diodes are oriented in opposite directions to each other.

5. An in-vehicle system comprising:
a relay box to which are connected a first wiring part electrically connected to the first electrical storage unit, a second wiring part electrically connected to a first load that receives power from the first electrical storage unit when the first switch unit and the second switch unit are OFF, and a third wiring part electrically connected to a second load that receives power from the second electrical storage unit when the first switch unit and the second switch unit are OFF; and
the relay device according to claim 1,
wherein the relay device is disposed inside or outside the relay box,
the power generator-side conduction path of the relay device is electrically connected to a wiring part from the power generator, and
the second electrical storage unit-side conduction path of the relay device is electrically connected to a wiring part from the second electrical storage unit.

6. An in-vehicle system comprising:
a relay box to which are connected a first wiring part electrically connected to the first electrical storage unit, a second wiring part electrically connected to a first load that receives power from the first electrical storage unit when the first switch unit and the second switch unit are OFF, and a third wiring part electrically connected to a second load that receives power from the second electrical storage unit when the first switch unit and the second switch unit are OFF; and
the relay device according to claim 2,
wherein the relay device is disposed inside or outside the relay box,
the power generator-side conduction path of the relay device is electrically connected to a wiring part from the power generator, and
the second electrical storage unit-side conduction path of the relay device is electrically connected to a wiring part from the second electrical storage unit.

7. An in-vehicle system comprising:
a relay box to which are connected a first wiring part electrically connected to the first electrical storage unit, a second wiring part electrically connected to a first load that receives power from the first electrical storage unit when the first switch unit and the second switch unit are OFF, and a third wiring part electrically connected to a second load that receives power from the second electrical storage unit when the first switch unit and the second switch unit are OFF; and
the relay device according to claim 4,
wherein the relay device is disposed inside or outside the relay box,
the power generator-side conduction path of the relay device is electrically connected to a wiring part from the power generator, and
the second electrical storage unit-side conduction path of the relay device is electrically connected to a wiring part from the second electrical storage unit.

* * * * *